US011624718B2

(12) United States Patent
Ros et al.

(10) Patent No.: US 11,624,718 B2
(45) Date of Patent: Apr. 11, 2023

(54) SINGLE PIECE DROPLET GENERATION AND INJECTION DEVICE FOR SERIAL CRYSTALLOGRAPHY

(71) Applicants: Alexandra Ros, Phoenix, AZ (US); Daihyun Kim, Mesa, AZ (US); Diandra Doppler, Scottsdale, AZ (US); Jorvani Cruz Villarreal, Tempe, AZ (US); Richard Kirian, Tempe, AZ (US); Reza Nazari, Tempe, AZ (US); Sahir Gandhi, Tempe, AZ (US)

(72) Inventors: Alexandra Ros, Phoenix, AZ (US); Daihyun Kim, Mesa, AZ (US); Diandra Doppler, Scottsdale, AZ (US); Jorvani Cruz Villarreal, Tempe, AZ (US); Richard Kirian, Tempe, AZ (US); Reza Nazari, Tempe, AZ (US); Sahir Gandhi, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 323 days.

(21) Appl. No.: 15/930,313

(22) Filed: May 12, 2020

(65) Prior Publication Data
US 2020/0363348 A1    Nov. 19, 2020

Related U.S. Application Data

(60) Provisional application No. 62/847,729, filed on May 14, 2019.

(51) Int. Cl.
*B01L 3/00* (2006.01)
*G01N 23/20025* (2018.01)
(Continued)

(52) U.S. Cl.
CPC ...... *G01N 23/20025* (2013.01); *B01L 3/0241* (2013.01); *B01L 3/502715* (2013.01);
(Continued)

(58) Field of Classification Search
CPC ......... G01N 23/20025; G01N 35/1016; G01N 2035/1034; B01L 3/0241; B01L 3/502715; B01L 2300/0645
(Continued)

(56) References Cited

U.S. PATENT DOCUMENTS 5,105,843 A * 4/1992 Condron ................. B29B 7/325
285/133.11
6,174,469 B1    1/2001 Ganan-Calvo
(Continued)

FOREIGN PATENT DOCUMENTS

WO    WO2009091416 A2    7/2009
WO    WO2011150368 A1    12/2011
(Continued)

OTHER PUBLICATIONS

Acero et al., "A new flow focusing technique to produce very thin jets," J. Micromech. Microeng., vol. 23, No. 6, p. 065009, 2013.
(Continued)

*Primary Examiner* — Christine T Mui
(74) *Attorney, Agent, or Firm* — Michael Best & Friedrich LLP

(57) ABSTRACT

A single-piece hybrid droplet generator and nozzle component for serial crystallography. The single-piece hybrid droplet generator component including an internally-formed droplet-generation channel, an internally-formed sample channel, a nozzle, and a pair of electrode chambers. The droplet-generation channel extends from a first fluid inlet opening to the nozzle. The sample channel extends from a second fluid inlet opening to the droplet-generation channel
(Continued)

and joins the droplet-generation channel at a junction. The nozzle is configured to eject a stream of segmented aqueous droplets in a carrier fluid from the droplet-generation channel through a nozzle opening of the single-piece component. The pair of electrode chambers are positioned adjacent to the droplet-generation channel near the junction between the droplet-generation channel and the sample channel. The timing of sample droplets in the stream of fluid ejected through the nozzle is controlled by applying a triggering signal to electrodes positioned in the electrode chambers of the single-piece component.

8 Claims, 6 Drawing Sheets

(51) Int. Cl.
    *G01N 23/201*     (2018.01)
    *B01L 3/02*     (2006.01)
    *G01N 35/10*     (2006.01)
    *G01N 23/20*     (2018.01)

(52) U.S. Cl.
    CPC ....... *G01N 23/201* (2013.01); *G01N 35/1016* (2013.01); *B01L 2300/0645* (2013.01); *G01N 2035/1034* (2013.01); *G01N 2223/054* (2013.01); *G01N 2223/1016* (2013.01); *G01N 2223/203* (2013.01); *G01N 2223/30* (2013.01); *G01N 2223/604* (2013.01); *G01N 2223/612* (2013.01); *G01N 2223/637* (2013.01)

(58) Field of Classification Search
    USPC ......................................................... 137/605
    See application file for complete search history.

(56) References Cited

U.S. PATENT DOCUMENTS

| | | | |
|---|---|---|---|
| 6,221,654 B1 | 4/2001 | Quake et al. |
| 6,822,180 B2 | 11/2004 | Fujii et al. |
| 6,976,590 B2 | 12/2005 | Deshpande et al. |
| 7,341,211 B2 | 3/2008 | Ganan Calvo et al. |
| 7,584,857 B2 | 9/2009 | Böhm et al. |
| 7,708,949 B2 | 5/2010 | Stone et al. |
| 8,272,576 B2 | 9/2012 | Doak et al. |
| 8,658,367 B2 | 2/2014 | Quake et al. |
| 8,827,548 B2 | 9/2014 | Roukes et al. |
| 8,844,570 B2 | 9/2014 | Glick |
| 9,038,919 B2 | 5/2015 | Link et al. |
| 9,126,365 B1 | 9/2015 | Mark et al. |
| 9,192,944 B2 | 11/2015 | Ros et al. |
| 9,227,200 B2 | 1/2016 | Chiou et al. |
| 9,289,787 B2 | 3/2016 | Doak et al. |
| 9,387,488 B2 | 7/2016 | Chou et al. |
| 9,446,360 B2 | 9/2016 | Mazutis |
| 9,643,136 B2 | 5/2017 | Hansen et al. |
| 9,839,922 B2 | 12/2017 | Doak et al. |
| 10,166,542 B2 | 1/2019 | Ros et al. |
| 10,413,920 B2 | 9/2019 | Doak et al. |
| 10,557,807 B2 | 2/2020 | Ros et al. |
| 2007/0003442 A1 | 1/2007 | Link et al. |
| 2007/0012891 A1 | 1/2007 | Maltezos et al. |
| 2007/0080062 A1 | 4/2007 | Harnett et al. |
| 2007/0228049 A1 | 10/2007 | Nordmeyer et al. |
| 2008/0105565 A1 | 5/2008 | Davalos et al. |
| 2009/0235990 A1 | 9/2009 | Beer |
| 2010/0163116 A1 | 7/2010 | Fang et al. |
| 2010/0196892 A1 | 8/2010 | Quake et al. |
| 2010/0224255 A1 | 9/2010 | Mathies et al. |
| 2010/0224493 A1 | 9/2010 | Davalos et al. |
| 2010/0303687 A1 | 12/2010 | Blaga et al. |
| 2012/0021523 A1 | 1/2012 | Fowler et al. |
| 2012/0085649 A1 | 4/2012 | Sano et al. |
| 2012/0266986 A1 | 10/2012 | Wimberger-Friedl et al. |
| 2013/0032235 A1 | 2/2013 | Johnstone et al. |
| 2013/0295653 A1 | 11/2013 | Quake et al. |
| 2013/0308756 A1 | 11/2013 | Bogan et al. |
| 2013/0313336 A1 | 11/2013 | Doak et al. |
| 2014/0038279 A1 | 2/2014 | Ingber et al. |
| 2014/0091012 A1 | 4/2014 | Ros et al. |
| 2014/0263693 A1 | 9/2014 | Doak et al. |
| 2014/0295572 A1 | 10/2014 | Fraden et al. |
| 2015/0087559 A1 | 3/2015 | Putnam et al. |
| 2016/0030658 A1 | 2/2016 | van der Merwe et al. |
| 2016/0051995 A1 | 2/2016 | Weierstall et al. |
| 2016/0129443 A1 | 5/2016 | Tovar et al. |
| 2016/0151784 A1 | 6/2016 | Chiou et al. |
| 2016/0341675 A1 | 11/2016 | Doak et al. |
| 2016/0370306 A1 | 12/2016 | Conrad et al. |
| 2017/0297024 A1 | 3/2017 | Ros et al. |
| 2017/0274380 A1 | 9/2017 | Weierstall et al. |
| 2018/0154380 A1 | 6/2018 | Doak et al. |
| 2019/0134631 A1 | 5/2019 | Ros et al. |
| 2019/0178822 A1 | 6/2019 | Ros et al. |
| 2019/0184395 A1 | 6/2019 | Ros et al. |
| 2019/0224689 A1 | 7/2019 | Ros et al. |
| 2019/0248065 A1 | 8/2019 | Gorin et al. |
| 2020/0141886 A1 | 5/2020 | Ros et al. |
| 2020/0360944 A1 | 11/2020 | Ros et al. |
| 2021/0001359 A1 | 1/2021 | Kirian et al. |

FOREIGN PATENT DOCUMENTS

| | | |
|---|---|---|
| WO | WO2013075081 A2 | 5/2013 |
| WO | WO2014151231 A1 | 9/2014 |
| WO | WO2016044545 A1 | 3/2016 |
| WO | WO2016164562 A1 | 10/2016 |
| WO | WO2017003725 A1 | 1/2017 |
| WO | WO2018013685 A1 | 1/2018 |
| WO | WO2018217793 A1 | 11/2018 |
| WO | WO2018217831 A1 | 11/2018 |

OTHER PUBLICATIONS

Akthakul A. et al., "Size fractionation of metal nanoparticles by membrane filtration", Advanced Materials, vol. 17, Issue 5, pp. 532-535 (2005).

Almen M.S. et al., "Mapping the human membrane proteome: a majority of the human membrane proteins can be classified according to function and evolutionary origin", BMC Biology, vol. 7, Issue 1, pp. 50 (2009).

Beech et al., "Tipping the balance of deterministic lateral displacement devices using dielectrophoresis," Lab Chip, 2009, 9:2698-2706.

Bhattacharya S. et al., "Insulator-based dielectrophoretic single particle and single cancer cell trapping", Electrophoresis, vol. 32, Issue 18, pp. 2550-2558 (2011).

Bligh M. et al., "Sorting microparticles into lateral streams using a two-phase rectangular electrokinetic array", Journal of Micromechanics and Microengineering, vol. 18, Issue 4, pp. 045002 (2008).

Boekema E.J. et al., "Evidence for a trimeric organization of the photosystem I complex from the thermophilic cyanobacterium *Synechococcus* sp.", FEBS Letters, vol. 217, Issue 2, pp. 283-286 (1987).

Bogunovic et al., Particle sorting by a structured microfluidic ratchet device with tunable selectivity: theory and experiment. Soft Matter 2012, 8 (14), 3900-3907.

Boutet S. et al., "High-Resolution Protein Structure Determination by Serial Femtosecond Crystallography", Science, vol. 337, Issue 6092, pp. 362-364 (2012).

Braschler et al., "Continuous separation of cells by balanced dielectrophoretic forces at multiple frequencies," Lab on a Chip, 2008, 8, 280-286.

Calzolai L. et al., "Separation and characterization of gold nanoparticle mixtures by flow-field-flow fractionation", Journal of Chromatography A, vol. 1218, Issue 27, pp. 4234-4239 (2011).

Cesaro-Tadic et al., High-sensitivity miniaturized immunoassays for tumor necrosis factor a using microfluidic systems. Lab on a Chip 2004, 4 (6), 563-569.

(56) References Cited

OTHER PUBLICATIONS

Chapman H. N. et al., "Femtosecond X-ray protein nanocrystallography", Nature-London, vol. 470, Issue 7332, pp. 73-77 (2011).
Chapman H.N., "X-ray imaging beyond the limits", Nature Materials, vol. 8, Issue 4, pp. 299-301 (2009).
Chen G. et al., "High-Purity Separation of Gold Nanoparticle Dimers and Trimers", Journal of the American Chemical Society, vol. 131, Issue 12, pp. 4218-4219 (2009).
Cheng I.F. et al., "A continuous high-throughput bioparticle sorter based on 3D traveling-wave dielectrophoresis", Lab on a chip, vol. 9, Issue 22. pp. 3193-3201 (2009).
Chinen et al., Nanoparticle Probes for the Detection of Cancer Biomarkers, Cells, and Tissues by Fluorescence. Chemical Reviews 2015, 115 (19), 10530-10574.
Chung et al., Ultrastructural changes of mitochondria in the skeletal muscle of patients with amyotrophic lateral sclerosis. Ultrastruct Pathol 2002, 26 (1), 3-7.
Cordelières, "Manual Tracking," ImageJ plugin, 2005, <https://imagej-nihgov.ezproxy1.lib.asu.edu/ij/plugins/track/track.html> 3 pages.
Cummings E.B. et al., "Dielectrophoresis in Microchips Containing Arrays of Insulating Posts: Theoretical and Experimental Results", Analytical Chemistry, vol. 75, Issue 18, pp. 4724-4731 (2003).
Davalos et al., "Performance impact of dynamic surface coatings on polymeric insulator-based dielectrophoretic particle separators," Anal. Bioanal. Chem. 2008, 390, 847-855.
DePonte, D. P., et al. "Gas Dynamic Virtual Nozzle for Generation of Microscopic Droplet Streams," J. Phys. D. Appl. Phys. 2008, 41, 195505, 7.
Dertinger S.K.W. et al., "Generation of Gradients Having Complex Shapes Using Microfluidic Networks", Anal. Chem., 73, 1240-1246 (2001).
Devaraju, N. et al., "Pressure driven digital logic in PDMS based microfluidic devices fabricated by multilayer soft lithography", Lab on a Chip, Nov. 2012, vol. 12, No. 22, pp. 4809-4815 <DOI:10.1039/c2lc21155f>.
Doak R.B. et al., "Microscopic linear liquid streams in vacuum: Injection of solvated biological samples into X-ray free electron lasers", AIP Conference Proceedings, vol. 1501, pp. 1314-1323 (2012).
Drews et al., Ratcheted electrophoresis for rapid particle transport. Lab on a Chip 2013, 13 (22), 4295-4298.
Duffy et al., "Determination of Properties of Individual Liposomes by Capillary Electrophoresis with Postcolumn Laser-Induced Fluorescence Detection," Anal. Chem. 2001, 73, 1855-1861.
Eguchi et al., Giant mitochondria in acute lymphocytic leukemia. Exp Mol Pathol 1987, 47(1), 69-75.
Fernández-Vizarra et al., Isolation of biogenetically competent mitochondria from mammalian tissues and cultured cells. Methods 2002, 26 (4), 292-297.
Fiedler S. et al., "Dielectrophoretic Sorting of Particles and Cells in a Microsystem", Analytical Chemistry, vol. 70, Issue 9, pp. 1909-1915 (1998).
Fromme P et al., "Improved isolation and crystallization of Photosystem I for structural analysis", Biochimica et Biophysica Acta, vol. 1365, Issue 1-2, pp. 175-184 (1998).
Fromme P. et al., "Femtosecond nanocrystallography using X-ray lasers for membrane protein structure determination", Current Opinion in Structural Biology, vol. 21, Issue 4, pp. 509-516 (2011).
Gan et al., "Six Helix Bundle and Triangle DNA Origami Insulator-Based Dielectrophoresis," Anal. Chem. 2013, 85, 11427-11434.
Gañá-Calvo et al., "Liquid Capillary Micro/Nanojets in Free-Jet Expansion," Small, vol. 6, No. 7, pp. 822-824, Apr. 2010.
Gascoyne P.R et al., "Particle separation by dielectrophoresis", Electrophoresis, vol. 23, Issue 13, pp. 1973-1983 (2002).
Gerion D. et al., "Sorting Fluorescent Nanocrystals with DNA", Journal of the American Chemical Society, vol. 124, Issue 24, pp. 7070-7074 (2002).
Giddings, "Unified Separation Science," Wiley ; New York 1991.

Gonzalez et al., Gonzalez, C. F.; Remcho, V. T., Fabrication and evaluation of a ratchet type dielectrophoretic device for particle analysis. Journal of Chromatography A 2009, 1216 (52), 9063-9070.
Gorre-Talini et al., Dielectrophoretic ratchets. Chaos 1998, 8(3), 650-656.
Green N.G. et al., "Dielectrophoresis of Submicrometer Latex Spheres. 1. Experimental Results", Journal of Physical Chemistry B, vol. 103, Issue 1, pp. 41-50 (1999).
Haenggi et al., Artificial Brownian motors: Controlling transport on the nanoscale. Reviews of Modern Physics 2009, 81 (1), 387-442.
Heffner et al., The early effects of ischemia upon skeletal muscle mitochondria. J Neurol Sci 1978, 38 (3), 295-315.
Hellmich W. et al., "Poly(oxyethylene) Based Surface Coatings for Poly(dimethylsiloxane) Microchannels", Langmuir, vol. 21, Issue 16, pp. 7551-7557 (2005).
Holmes D. et al., "On-chip high-speed sorting of micron-sized particles for high-throughput analysis", IEE proceedings. Nanobiotechnology, vol. 152, Issue 4, pp. 129-135 (2005).
Holzel et al., "Trapping Single Molecules by Dielectrophoresis," Phys. Rev. Lett. 2005, 95, 128102.
Hornig-Do et al., "Isolation of functional pure mitochondria by superparamagnetic microbeads," Anal. Biochem. 2009, 389, 1-5.
Huang et al., "Current-monitoring method for measuring the electroosmotic flow rate in capillary zone electrophoresis," Anal. Chem. 1988, 60, 1837-1838.
Hunter M.S. et al., "Toward structure determination using membrane-protein nanocrystals and microcrystals", Methods, vol. 55, Issue 4, pp. 387-404 (2011).
Hunter M.S. et al., "X-ray Diffraction from Membrane Protein Nanocrystals", Biophysical Journal, vol. 100, Issue 1, pp. 198-206 (2011).
International Preliminary Report on Patentability for Application No. PCT/US2017/041708 dated Jan. 24, 2019, 8 pages.
International Preliminary Report on Patentability for Application No. PCT/US2018/033989 dated Dec. 5, 2019, 7 pages.
International Search Report and Written Opinion for Application No. PCT/US2015/050616 dated Jan. 18, 2016, 11 pages.
International Search Report and Written Opinion for Application No. PCT/US2017/041708 dated Oct. 23, 2017, 9 pages.
International Search Report and Written Opinion for Application No. PCT/US2018/033944 dated Sep. 26, 2018, 14 pages.
International Search Report and Written Opinion for Application No. PCT/US2018/033989 dated Jul. 20, 2018, 13 pages.
Jeon N.L. et al., "Generation of Solution and Surface Gradients Using Microfluidic Systems", Langmuir, 16, 8311-8316 (2000).
Jones et al., "Continuous Separation of DNA Molecules by Size Using Insulator-Based Dielectrophoresis," Anal. Chem. 2017, 89, 1531-1539.
Jordan P. et al., "Three-dimensional structure of cyanobacterial photosystem I at 2.5 A resolution", Nature, vol. 411, Jun. 21, pp. 909-917 (2001).
Jores K. et al., "Investigations on the structure of solid lipid nanoparticles (SLN) and oil-loaded solid lipid nanoparticles by photon correlation spectroscopy, field-flow fractionation and transmission electron microscopy", Journal of Controlled Release, vol. 95, Issue 2, pp. 217-227 (2004).
Kale et al., Continuous-flow dielectrophoretic trapping and patterning of colloidal particles in a ratchet microchannel. Journal of Micromechanics and Microengineering 2014, 24 (7) 6 pages.
Kang et al., Separation of mitochondria by flow field-flow fractionation for proteomic analysis. Analyst 2008, 133 (4), 505-515.
Kim et al., "Deterministic Ratchet for Sub-micrometer (Bio)particle Separation," Anal. Chem., 2018, 90 (7), pp. 4370-4379.
Kim et al., "Dynamic Constriction Insulator-Based Dielectrophoresis for Particle Manipulation," 2016, 1 page.
Kissick D.J. et al., "Second-Order Nonlinear Optical Imaging of Chiral Crystals", Annual Review of Analytical Chemistry, vol. 4, pp. 419-437 (2011).
Kralj J.G. et al., "Continuous Dielectrophoretic Size-Based Particle Sorting", Analytical Chemistry, vol. 78, Issue 14, pp. 5019-5025 (2006).
Kung, Y-C. et al., "Tunable dielectrophoresis for sheathless 3D focusing", IEEE International Conference on Micro Electro Mechani-

(56) References Cited

OTHER PUBLICATIONS cal Systems (Estoril, Portugal, Jan. 18-22, 2015), 2015 (Date added to IEEE Xplore: Mar. 2015), pp. 196-199 <DOI:10.1109/MEMSYS.2015.7050920>.
Lapizco-Encinas B.H. et al., "Insulator-based dielectrophoresis for the selective concentration and separation of live bacteria in water", Electrophoresis, vol. 25, Issue 10-11, pp. 1695-1704 (2004).
Latham A.H. et al., "Capillary Magnetic Field Flow Fractionation and Analysis of Magnetic Nanoparticles", Analytical Chemistry, vol. 77, Issue 15, pp. 5055-5062 (2005).
Li N. et al., "Parallel mixing of photolithographically defined nanoliter volumes using elastomeric microvalve arrays", Electrophoresis, 26, 3758-3764 (2005).
Liao et al., "Nanoscale Molecular Traps and Dams for Ultrafast Protein Enrichment in High-Conductivity Buffers," J. Am. Chem. Soc. 2012, 134, 8742-8745.
Lin et al., Highly selective biomechanical separation of cancer cells from leukocytes using microfluidic ratchets and hydrodynamic concentrator. Biomicrofluidics 2013, 7 (3); 034114.
Loutherback et al., Deterministic Microfluidic Ratchet. Physical Review Letters 2009, 102, 045301.
Lundstrom K., "Structural genomics and drug discovery", Journal of Cellular and Molecular Medicine, vol. 11, Issue 2, pp. 224-238 (2007).
Luo et al., Insulator-based dielectrophoresis of mitochondria. Biomicrofluidics 2014, 8 (2), 021801.
Luo, J. H.; Muratore, K. A.; Arriaga, E. A.; Ros, A., Deterministic Absolute Negative Mobility for Micro- and Submicrometer Particles Induced in a Microfluidic Device. Analytical Chemistry 2016, 88 (11), 5920-5927.
Mafune, F, et al., "Microcrystal Delivery by Pulsed Liquid Droplet for Serial Femtosecond Crystallography", Acta Crystallographica Section D, Apr. 2016 [available online Mar. 2016], vol. 72, Part 4, pp. 520-523 <DOI:10.1107/S2059798316001480>.
Majewski P. et al., "Synthesis, Surface Modifications, and Size-Sorting of Mixed Nickel-Zinc Ferrite Colloidal Magnetic Nanoparticles", Chemistry: a European journal, vol. 14, Issue 26, pp. 7961-7968 (2008).
Mancuso, A. P., "The Single Particles, Clusters and Biomolecules and Serial Femtosecond Crystallography instrument of the European XFEL: initial installation", J. Synchrotron Radiation 2019, 26, 660-676.
Marquet et al., Rectified motion of colloids in asymmetrically structured channels. Physical Review Letters 2002, 88 (16) 168301.
Martinez-Duarte R. et al., "Microfabrication technologies in dielectrophoresis applications—A review", Electrophoresis, vol. 33, Issue 21, pp. 3110-3132 (2012).
Martinez-Lopez et al., "Characterization of electrokinetic mobility of microparticles in order to improve dielectrophoretic concentration," Anal. Bioanal. Chem. 2009, 394, 293-302.
Martin-Garcia, J. M., et al. "Serial Femtosecond Crystallography: A Revolution in Structural Biology," Arch. Biochem. Biophys. 2016, 602, 32-47.
Matias et al., Giant mitochondria and intramitochondrial inclusions in benign thyroid lesions. Ultrastruct Pathol 1991, 15 (3), 221-9.
McFaul et al., Cell separation based on size and deformability using microfluidic funnel ratchets. Lab on a Chip 2012, 12 (13), 2369-2376.
Michelsen et al., Isolation of Subcellular Organelles and Structures. Methods in Enzymology 2009, 463, 305-28.
Morgan et al., Separation of submicron bioparticles by dielectrophoresis. Biophysical Journal 1999, 77 (1), 516-525.
Muller T. et al., "A 3-D microelectrode system for handling and caging single cells and particles", Biosensors & Bioelectronics, vol. 14, Issue 3, pp. 247-256 (1999).
Nakano A. et al., "Tuning direct current streaming dielectrophoresis of proteins", Biomicrofluidics, vol. 6, Issue 3, pp. 34108 (2012).
Nakano et al., "Temporal and Spatial Temperature Measurement in Insulator-based Dielectrophoretic Devices," Analytical Chemistry (2014) 86, 6516-6524.

Nakano et al., Immunoglobulin G and bovine serum albumin streaming dielectrophoresis in a microfluidic device. Electrophoresis 2011, 32 (17), 2314-2322.
Navratil et al., Giant mitochondria do not fuse and exchange their contents with normal mitochondria. Exp Cell Res 2008, 314 (1), 164-72.
Nelson et al., "Three-dimensional-printed gas dynamic virtual nozzles for x-ray laser sample delivery". Optics Express, 2016, 24, 11515-11530.
Novak J P. et al., "Purification of Molecularly Bridged Metal Nanoparticle Arrays by Centrifugation and Size Exclusior Chromatography", Analytical Chemistry, vol. 73, Issue 23, pp. 5758-5761 (2001).
Ozuna-Chacon S. et al., "Performance characterization of an insulator-based dielectrophoretic microdevice", Electrophoresis, vol. 29, Issue 15, pp. 3115-3122 (2008).
Pamme N. et al., "Continuous sorting of magnetic cells via on-chip free-flow magnetophoresis", Lab on a Chip, vol. 6, Issue 8, pp. 974-980 (2006).
Pamme N. et al., "On-Chip Free-Flow Magnetophoresis: Continuous Flow Separation of Magnetic Particles and Agglomerates", Analytical Chemistry, vol. 76, Issue 24, pp. 7250-7256 (2004).
Papadimitriou et al., Giant mitochondria with paracrystalline inclusions in paraganglioma of the urinary bladder: correlation with mitochondrial abnormalities in paragangliomas of other sites. Ultrastruct Pathol 1994, 18 (6), 559-64.
Pethig, Review Article—Dielectrophoresis: Status of the theory, technology, and applications. Biomicrofluidics 2010, 4 (2) 022811-1-022811-35.
Pohl H.A. et al., "Di Electrophoresis of Cells", Biophysical Journal, vol. 11, pp. 711-727 (1971).
Pohl H.A. et al., "Dielectrophoretic Force", J Theor. Biol., vol. 37, pp. 1-13 (1972).
Pohl, Dielectrophoresis : The Behavior of Neutral Matter in Non-uniform Electric Fields. Cambridge ; New York : Cambridge University Press 1978.
Pommer M.S. et al., "Dielectrophoretic separation of platelets from diluted whole blood in microfluidic channels", Electrophoresis, vol. 29, Issue 6, pp. 1213-1218 (2008).
Redecke L. et al., "Natively Inhibited Trypanosoma brucei Cathepsin B Structure Determined by Using an X-ray Laser", Science, vol. 339, Issue 6116, pp. 227-230 (2013).
Regtmeier et al., "Dielectrophoretic manipulation of DNA: Separation and polarizability," A. Anal. Chem. 2007, 79, 3925-3932.
Regtmeier et al., Acceleration of absolute negative mobility. Journal of Separation Science 2007, 30 (10), 1461-1467.
Roessler, C. et al., "Acoustic Injectors for Drop-On-Demand Serial Femtosecond Crystallography", Structure, Apr. 2016 [available online Mar. 2016], vol. 24, No. 4, pp. 631-6410, S1-S19.
Ros et al., "Co-flow injection facilitates improved injection for MHz Crystallography," published Mar. 2, 2020, (2 pages).
Safarik et al., Magnetic techniques for the isolation and purification of proteins and peptides. Biomagn Res Technol 2004, 2, 7, 18 pages.
Salomon S. et al., "A dielectrophoretic continuous flow sorter using integrated microelectrodes coupled to a channel constriction", Electrophoresis, vol. 32, Issue 12, pp. 1508-1514 (2011).
Schubert W.D. et al., "Photosystem I of Synechococcus elongatus at 4 A Resolution: Comprehensive Structure Analysis", Journal of Molecular Biology, vol. 272, Issue 5, pp. 741-769 (1997).
Shafiq et al., Giant mitochondria in human muscle with inclusions. Arch Neurol 1967, 17 (6), 666-71.
Spence J.C. et al., "X-ray lasers for structural and dynamic Biology", Rep Prog Phys, vol. 75, Issue 10, pp. 102601 (2012).
Srivastava S.K. et al., "A continuous DC-insulator dielectrophoretic sorter of microparticles", Journal of chromatography. A, vol. 1218, Issue 13, pp. 1780-1789 (2011).
Srivastava S.K. et al., "DC insulator dielectrophoretic applications in microdevice technology: a review", Analytical and Bioanalytical Chemistry, vol. 399, Issue 1, pp. 301-321 (2011).
Srivastava S.K. et al., "Direct current insulator-based dielectrophoretic characterization of erythrocytes: ABO-Rh human blood typing", Electrophoresis, vol. 32, Issue 18, pp. 2530-2540 (2011).

(56) References Cited

OTHER PUBLICATIONS

Sturm et al., Ratchets in hydrodynamic flow: more than waterwheels. Interface Focus 2014, 4 (6) 9 pages.

Sugiura, Y. et al., "Fabrication of Microfluidic Valves Using a Hydrogel Molding Method", Scientific Reports, Aug. 2015, vol. 5, No. 13375, 7 pages <DOI:10.1038/srep13375>.

Tang, S. et al., "Basic Microfluidic and Soft Lithographic Techniques", in: Optofluidics: Fundamentals, Devices and Applications (Ed. Y. Fainmain), 2010, Ch. 2, pp. 7-31.

Thoenes et al., On matrix-rich giant mitochondria. Electron microscopic observations on tubular epithelium of the human kidney in the nephrotic syndrome. Z Zellforsch Mikrosk Anat 1966, 75 (2), 422-33.

Tice, J. et al., "A monolithic poly(dimethylsiloxane) electrostatic actuator for controlling integrated pneumatic microsystems", Sensors and Actuators A: Physical, Jul. 2013 (available online Mar. 2013), vol. 196, pp. 22-29 <DOI:10.1016/j.sna.2013.03.020>.

U.S. Appl. No. 15/930,239, filed May 12, 2020, Ros et al.

Unger et al., "Monolithic microfabricated valves and pumps by multilayer soft lithography," Science, 288, 113-16 (2000).

Vega et al., "Global and local instability of flow focusing: The influence of the geometry," Physics of Fluids, vol. 22, No. 6, p. 064105, Jun. 2010.

Vidal, C. et al., "Fabrication of Pneumatic Microvalves for PDMS Microfluidic Devices", International Congress of Mechanical Engineering (Gramado, Brazil, Nov. 15-20, 2009), 2009, 7 pages.

Viefhues M. et al., "Physisorbed surface coatings for poly(dimethylsiloxane) and quartz microfluidic devices", Analytical and Bioanalytical Chemistry, vol. 401, Issue 7, pp. 2113-2122 (2011).

Wampler R.E. et al., "Selective Detection of Protein Crystals by Second Harmonic Microscopy", Journal of the American Chemical Society, vol. 130, Issue 43, pp. 14076-14077 (2008).

Weierstall U. et al., "Injector for scattering measurements on fully solvated biospecies", Review of Scientific Instruments. vol. 83, Issue 3, pp. 035108 (2012).

Weierstall, U., et al. "Lipidic cubic phase injector facilitates membrane protein serial femtosecond crystallography," Nat. Commun. 2014, 5, 1, 3309.

Wiedorn, M., et al. "Megahertz Serial Crystallography," Nat. Commun. 2018, 9, 1, 4025.

Yamada et al. "Differential Permeabilization Effects of Ca2+ and Valinomycin on the Inner and Outer Mitochondrial Membranes as Revealed by Proteomics Analysis of Proteins Released from Mitochondria," Mol. Cell Proteomics, 2009, 8, 1265-1277.

Yang et al, "Toward Analysis of Proteins in Single Cells: A Quantitative Approach Employing Isobaric Tags with MALDI Mass Spectrometry Realized with a Microfluidic Platform," Anal. Chem. 2016, 88, 6672-6679.

Yang et al., High Speed Size Sorting of Subcellular Organelles by Flow Field-Flow Fractionation. Analytical Chemistry 2015, 87 (12), 6342-6348.

Yang J. et al., "Size sorting of Au and Pt nanoparticles from arbitrary particle size distributions", Analytica Chimica Acta, vol. 546, Issue 2, pp. 133-138 (2005).

Yates et al, "Proteomics of organelles and large cellular structures," Nat. Rev. Mol. Cell Biol. 2005, 6, 702-714.

Zhu J. et al., Dielectrophoretic focusing of particles in a microchannel constriction using DC-biased AC electric fields, Electrophoresis, vol. 30, Issue 15 pp. 2668-2675 (2009).

* cited by examiner

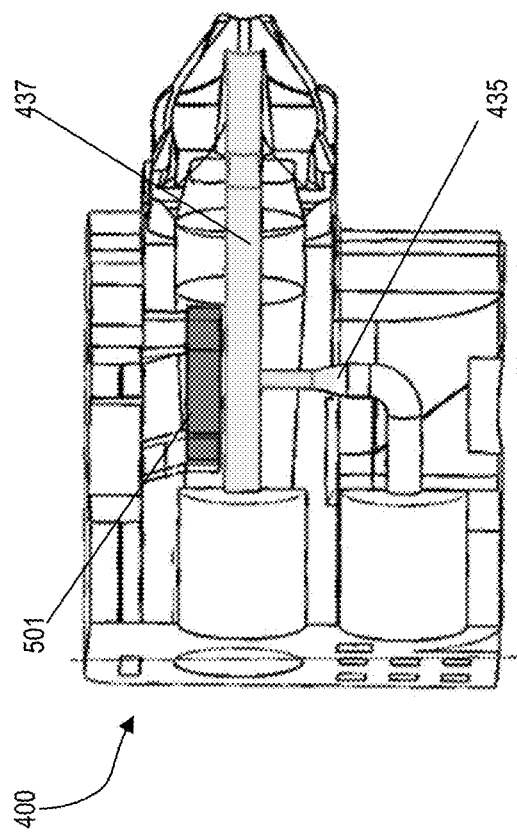
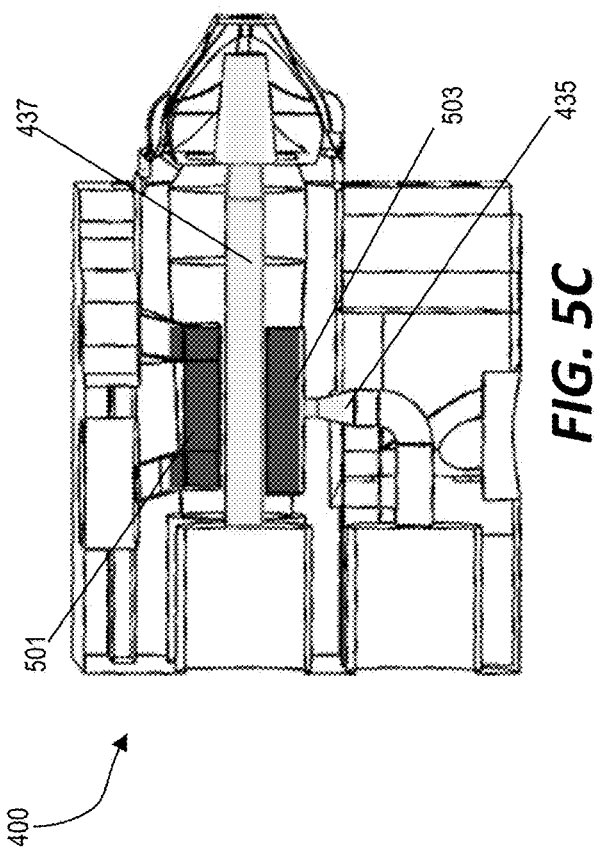
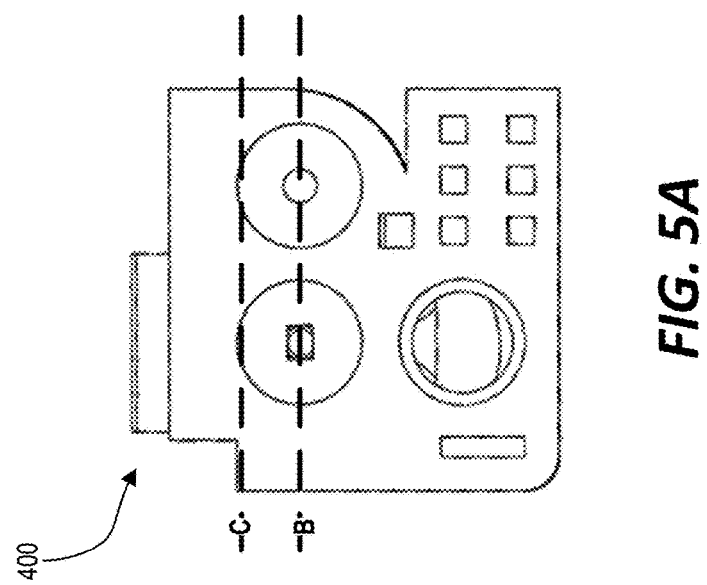

SINGLE PIECE DROPLET GENERATION AND INJECTION DEVICE FOR SERIAL CRYSTALLOGRAPHY

RELATED APPLICATIONS

This application claims the benefit of U.S. Provisional Patent Application No. 62/847,729, filed May 14, 2019 and entitled "DROPLET GENERATION AND INJECTION FOR SERIAL CRYSTALLOGRAPHY," the entire contents of which are incorporated herein by reference.

STATEMENT REGARDING FEDERALLY SPONSORED RESEARCH OR DEVELOPMENT

This invention was made with government support under R01 GM095583 awarded by the National Institutes of Health and under 1231306 awarded by the National Science Foundation. The government has certain rights in the invention.

BACKGROUND

The present invention relates to systems and methods for crystallography. More specifically, this invention relates to systems and methods for generating a sample stream for serial crystallography.

SUMMARY

Serial femtosecond crystallography (SFX) is used to determine the structure of macromolecules at ambient temperature and, in some implementations, enables the study of large membrane protein complexes at atomic resolution and reaction dynamics of the same, which was generally unable to be done using traditional crystallographic methods. In SFX experiments with X-Ray fee electron lasers (XFELs), sample crystals are positioned in the beam of the XFEL. Each crystal hit by the XFEL is destroyed and the sample needs to be replenished between X-ray pulses. In some implementations, this is accomplished by a continuous injection of crystal suspension. Large amounts of sample are required to collect a complete X-ray diffraction data set for high-resolution crystal structures. Additionally, any crystal samples delivered in the path of the X-ray beam during its "off-time" (i.e., time between pulses) is wasted due to the intrinsic pulsed nature of XFELs. In some cases, up to one gram of protein may be required for the continuous injection stream and, of that one gram, up to 99% of the protein is wasted between pulses. Accordingly, in some cases, sample preparation constitutes a major limiting factor for SFX with XFELs.

In some implementations, a device for use in a hybrid droplet generator includes a first channel, a second channel, a third channel, and an outlet passage. The second channel is in communication with the first channel via a junction. The outlet passage is disposed downstream from the junction. The third channel is in communication with the outlet passage. The device also includes electrodes that are coupled to the outlet passage. The electrodes are configured to provide an electric current to a stream of segmented aqueous droplets in a carrier fluid flowing through the junction.

In other embodiments, a device for use in a hybrid droplet generator includes a first channel, a second channel, a third channel, and electrodes. The second channel is in communication with the first channel via a T-junction. The third channel is concentric with the first channel and in communication with the first channel and the second channel downstream of the T-junction. The electrodes are coupled to at least one of the first channel and the second channel. The electrodes are configured to provide an electric current to a stream flowing through the junction.

In one embodiment, the invention provides a single-piece hybrid droplet generator and nozzle component for serial crystallography. The single-piece hybrid droplet generator component including an internally-formed droplet-generation channel, an internally-formed sample channel, a nozzle, and a pair of electrode chambers. The droplet-generation channel extends from a first fluid inlet opening to the nozzle. The sample channel extends from a second fluid inlet opening to the droplet-generation channel and joins the droplet-generation channel at a junction. The nozzle is configured to eject a fluid from the droplet-generation channel through a nozzle opening of the single-piece component. The pair of electrode chambers are positioned adjacent to the droplet-generation channel near the junction between the droplet-generation channel and the sample channel. The timing of sample droplets in the stream of fluid ejected through the nozzle is controlled by applying a triggering signal to electrodes positioned in the electrode chambers of the single-piece component.

Other aspects of the invention will become apparent by consideration of the detailed description and accompanying drawings.

BRIEF DESCRIPTION OF THE DRAWINGS

FIG. 5A is an elevation view of the rear surface of the single piece device of FIG. 4A.

FIG. 5B is a first cross-sectional overhead view of the single piece device of FIG. 4A.

FIG. 5C is a second cross-sectional overhead view of the single piece device of FIG. 4A.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
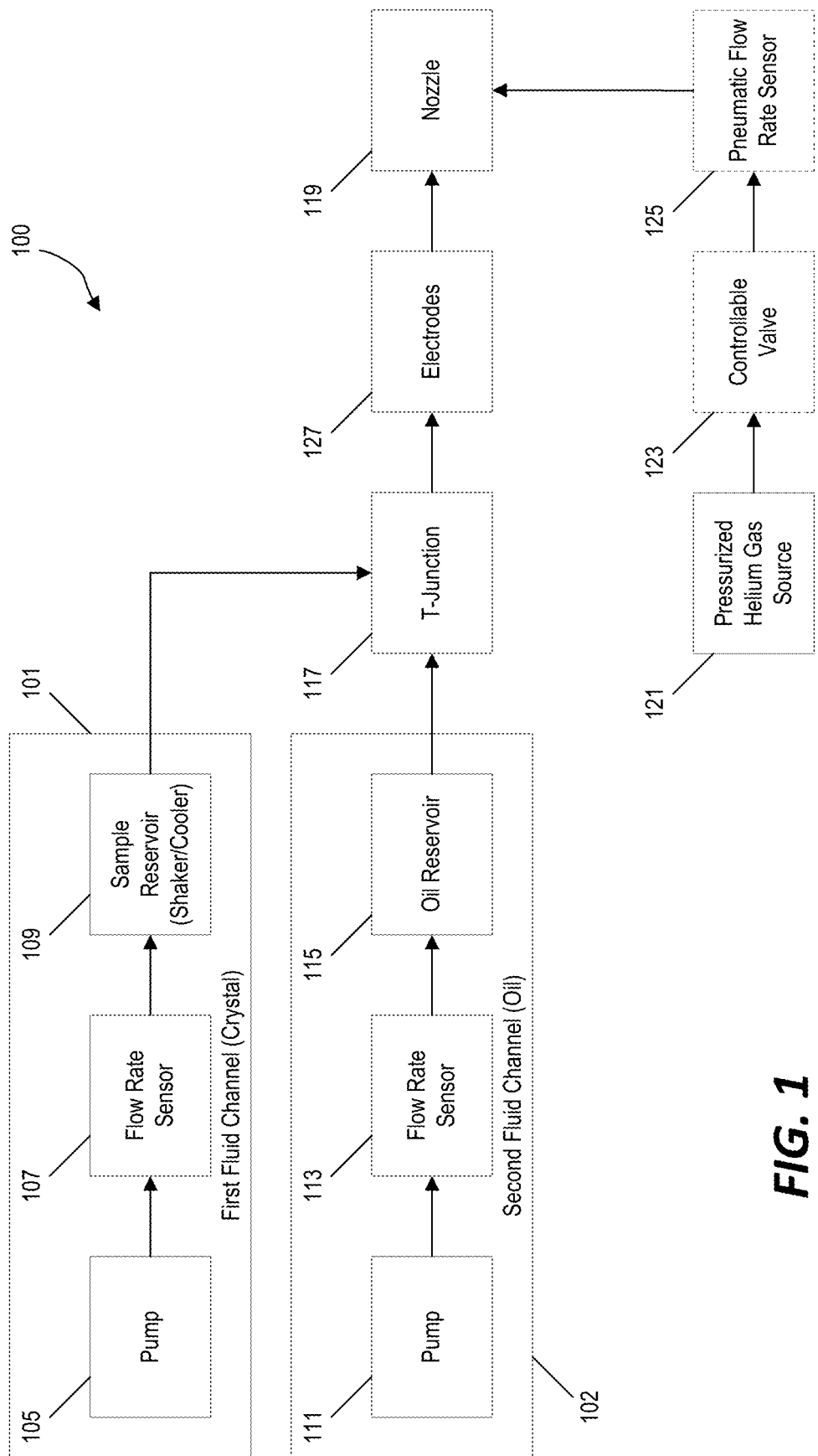
FIG. 1 is a block diagram of a sample injection system for serial crystallography.

FIG. 1 illustrates an example of a sample ejection system 100 that provides for controlled generation of a stream of segmented aqueous droplets in a carrier fluid and ejection of a stream. For example, the system 100 may be configured for "water-in-oil" droplet generation of a crystal sample (suspended in a fluid media) as a sequence of droplets in a stream of oil fluid in order to inject the aqueous droplets with the sample into an X-ray beam for serial crystallography. The system 100 also includes an electrode configuration in order to controllably synchronize the flow of droplets with the pulse rate of the X-ray beam.

The system 100 of FIG. 1 includes a first fluid channel 101 and a second fluid channel 102. The first fluid channel 101 includes a pump 105, a flow rate sensor 107, and a sample reservoir 109. The pump 105 is operated to move fluid from the sample reservoir 107 through the first fluid channel 101. By monitoring the output of the flow rate sensor 107 and using the output of the flow rate sensor 107 as control feedback, the pump 105 can be adjusted to controllably regulate the rate of fluid flow from the sample reservoir 109. In some implementations, the sample reservoir 109 may further include a shaker or cooler mechanism for preparing and/or maintaining the sample before it is pumped through the first fluid channel 101. The second fluid channel 102 similarly includes a pump 111, a flow rate sensor 113, and an oil reservoir 115. The pump 111 is controllably operated based on an output signal of the flow rate sensor 113 to control the rate at which fluid is pumped from the oil reservoir 115 through the second fluid channel 102.

In some implementations, the sample reservoir 109 is configured to hold a volume of a crystal sample suspended in an aqueous fluid (e.g., water) and the oil reservoir 115 is configured to hold an oil. The fluids from each of the two fluid channels 101, 102 are pumped towards a T-junction 117 where they are combined in the same output channel as a stream of segmented aqueous droplets in a carrier fluid (as described further below) towards a nozzle 119. In some implementations, the nozzle 119 is a gas dynamic virtual nozzle (GDVN) configured to receive pressurized helium gas from a pressurized helium gas source 121. In some implementations, the system 100 also includes a controllable pneumatic valve 123 to regulate a flow rate of the pressurized helium gas from the source 121 and a pneumatic flow rate sensor 125 to measure the actual pneumatic flow of helium gas towards the nozzle 119 so that the position of the controllable valve 123 can be adjusted towards a target pneumatic flow rate. The nozzle 119 is configured to emit the combined fluid stream and the pressurized helium gas coaxially with the combined fluid stream at the center of the pressurized helium gas flow, which results in a "jetting" of the fluid output stream.

By controlling the flow rate of the sample suspension fluid (through the first fluid channel 101) and the flow rate of the oil (through the second fluid channel 102), the system can be operated to controllably introduce the sample suspension fluid into the oil stream as a series of droplets. As described in further detail below, an electrode configuration (i.e., electrodes 127) is positioned and configured to apply an electrical signal to the fluid stream that effectively regulates the position, sequence, and synchronization of the sample droplets in the output fluid stream that is ejected from the nozzle 119. In some implementations, the electrodes 127 are configured as "non-contact electrodes" that do not physically contact the fluid stream and may be made from gallium, silver, or another suitable material. The electrodes 127 induce local electric fields that change the water-in-oil interface and trigger the change of droplet generation frequency.

Figure 2:
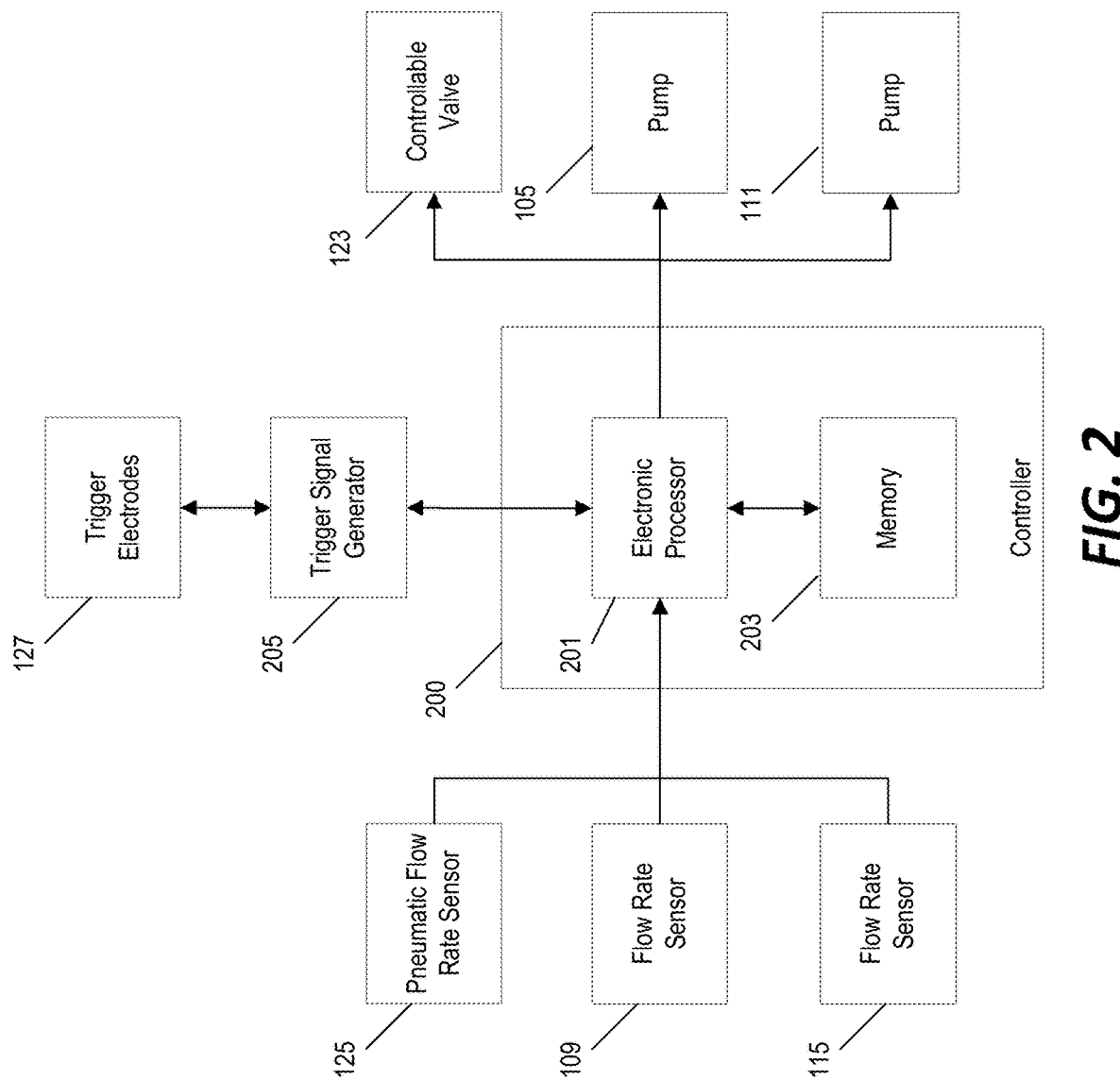
FIG. 2 is a block diagram of a control system for the sample injection system of FIG. 1.

FIG. 2 illustrates an example of a control system for the system 100 of FIG. 1. A controller 200 includes an electronic processor 201 and a non-transitory, computer-readable memory 203. The memory 203 stores data and computer-executable instructions that are accessed & executed by the electronic processor 201 to provide the functionality of the controller 200 (including, for example, the functionality described herein). The controller 200 may be implemented, for example, as a desktop computer system or as an application-specific system.

The controller 200 is communicatively coupled to the pump 105 of the first fluid channel 101, the pump 111 of the second fluid channel 102, and the controllable pneumatic valve 123 and provides control signal that regulate/adjust the operation of these components. The controller 200 is also communicatively coupled to the flow rate sensor 109 of the first fluid channel 101, the flow rate sensor 115 of the second fluid channel 102, and the pneumatic flow rate sensor 125. Accordingly, in some implementations, the control 200 operates the system 100 to achieve target fluid flow rates in the first fluid channel 101 & the second fluid channel 102 and to provide a target pneumatic flow/pressure of the helium gas provided to the nozzle 119 by adjusting the control signals provided to the pump 105, the pump 111, and the controllable valve 123 based, at least in part, on the sensor signals received from the flow rate sensors 109, 115, 125. The controller 200 is also communicatively coupled to a trigger signal generator 205 that is configured to generate a trigger signal that is applied to the trigger electrodes 127 in order to controllably regulate the droplet generation frequency of the system 100.

Furthermore, although FIG. 2 illustrates only a single controller 200, in some implementations, a plurality of controllers may be configured to provide the functionality and processing for the system 100. For example, in some implementations, a separate controller is implemented to regulating the pneumatic components independently from the droplet generation functionality. In some such implementations, the controllable valve 123 and the pneumatic flow rate sensor 125 are communicative coupled to a separate controller, which is configured to provide for pneumatic control and to regulate a gas mass flow rate in order to establish a properly formed "jet" from the nozzle, but does not provide any functionality related to droplet generation and triggering.

Figure 3A:
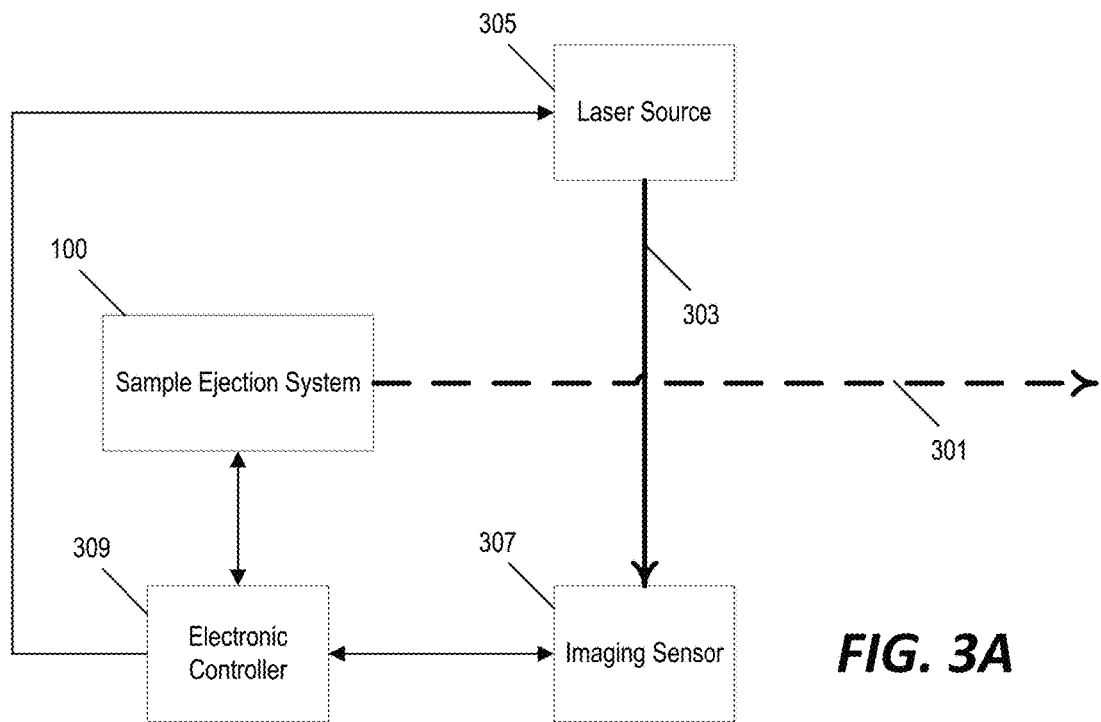
FIG. 3A is a schematic diagram of serial crystallography system including the sample injection system of FIG. 1.

FIG. 3A illustrates an example of the operational configuration of the sample ejection system 100 for serial crystallography. The sample ejection system 100 is controllably operated to eject a jetted fluid stream 301 through the optical path of an x-ray laser beam 303. The x-ray laser beam 303 is generated by a laser source 305 and diffraction of the x-ray laser beam 303 caused by the sample in the output stream 301 is captured by an imaging sensor 307. One or more electronic controllers 309 are communicatively coupled to the sample ejection system 100, the laser source 305, and the imaging sensor 307 to control the characteristics of the output stream 301 as well as receiving and processing image data from the imaging sensor 307 in order to determine a molecular structure (and, in some cases, other properties) of the sample crystal in the output stream 301. In some implementations, the electronic controller 309 (or a different, separate electronic controller) is configured to operate the x-ray laser beam 303 (e.g., controlling the on/off status of the laser source 305) and/or to receive information from the laser source 305 regarding the pulse timing of the laser beam 303.

As described above, the system 100 of FIG. 1 is controlled to produce an output stream 301 that includes a series of droplets in an oil fluid. The droplets include a crystal sample suspended in an aqueous medium (e.g., water). The droplets are introduced into the oil fluid stream at the T-junction 117 and certain characteristics of the droplets (including, for example, the size, frequency, etc.) can be controlled in part by adjusting the flow rate of the sample suspension and the oil fluid using pumps 105, 111. The properties of the crystals in the sample are determined by analyzing diffraction data of the x-ray laser beam interacting with the output stream 301. However, useful diffraction data is only obtained when the laser beam is diffracted by one of the sample suspension droplets. Sample droplets passing through the optical path of the x-ray laser beam 303 when the x-ray laser beam is between pulses are effectively wasted as they produce no useful diffraction data. Accordingly, the trigger electrodes 127 are controllably operated to apply an electrical signal to the stream of "water-in-oil" droplets at or near the T-junction 117.

Figure 3B:
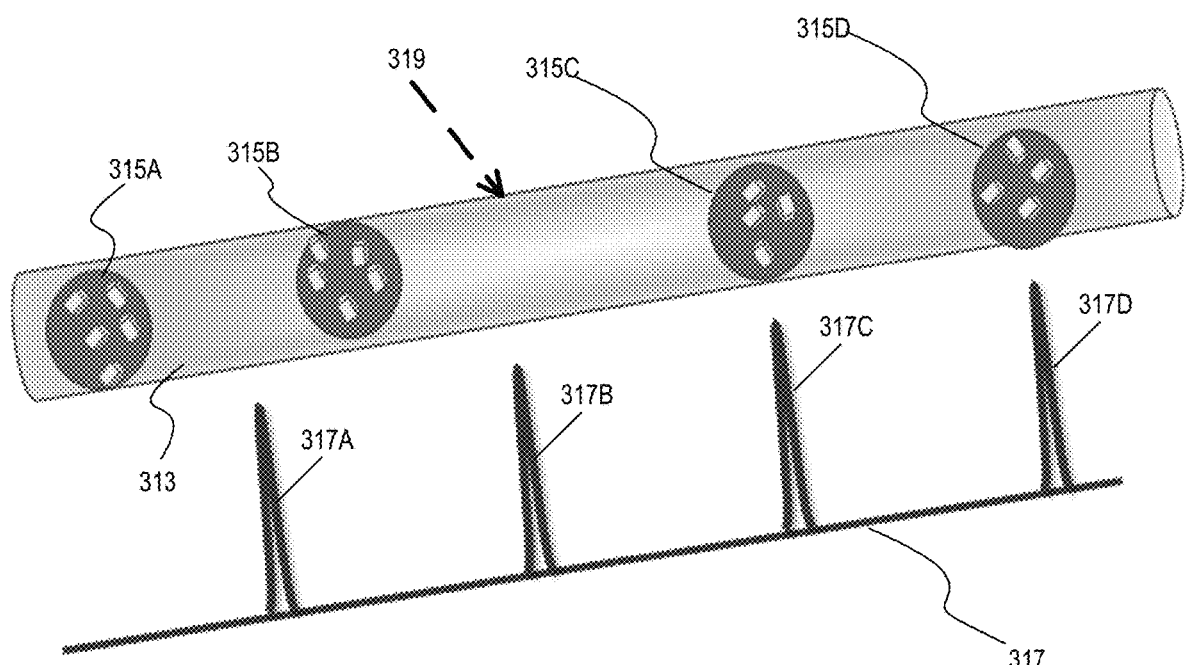
FIG. 3B is a schematic diagram of a triggering operation for synchronizing sample droplets in the output stream generated by the sample injection system of FIG. 1 with the laser beam pulses in the serial crystallography system of FIG. 3A.

FIG. 3B illustrates one example of the electrode-based triggering for synchronizing the droplet flow with the x-ray laser pulse. FIG. 3B shows the oil fluid stream 313 with a series of droplets 315A, 315B, 315C, 315D. A schematic example of the x-ray laser pulse signal 317 is illustrated adjacent to the water-in-oil stream. As shown in FIG. 3B, the first two droplets 315A, 315B are not appropriately synchronized with pulses 317A, 317B of the x-ray laser pulse signal 317. However, when the triggering signal 319 is applied to the "water-in-oil" droplet stream by the electrodes 127, the generation and release of sample suspension droplets 315C, 315D are controllably synchronized with the pulses 317C, 317D of the x-ray laser pulse signal 317. As a result, droplet 315C will reach the optical path of the x-ray laser beam 303 at the same time as the pulse 317C. Similarly, droplet 315D will be temporally synchronized with pulse 317D and will reach the optical path of the x-ray laser beam 303 at the same time as the pulse 317D. Further details and examples of operating electrodes to apply a triggering signal to synchronize droplets in a fluid stream with pulses of a laser beam are described in International Patent Publication No. WO 2018/217831, entitled "METAL ELECTRODE BASED 3D PRINTED DEVICE FOR TUNING MICROFLUIDIC DROPLET GENERATION FREQUENCY AND SYNCHRONIZING PHASE FOR SERIAL FEMTOSECOND CRYSTALLOGRAPHY," the entire contents of which are incorporated herein by reference.

FIGS. 4A through 4D illustrate a single-piece device 400 that provides electrode-based droplet generation with a T-junction and electrodes in close proximity to a gas dynamic virtual nozzle (GDVN) to inject a protein crystal sample for serial crystallography. In this single-piece device 400, the droplet triggering device and the gas dynamic virtual nozzle are integrated into a single piece. In some implementations, the device 400 is fabricated by 2-photon polymerization in a monolithic piece. However, in other implementations, different 3D printing, molding, or other fabrications techniques may be utilized. In some implementations, as described in further detail below, silica capillaries for liquid and gas delivery are coupled to the device and gallium or silver-based non-contact metal electrodes embedded into the 3D printed device are used to induce local electric fields that change the water-in-oil interface and trigger the change of droplet generation frequency. Droplets of aqueous crystal suspension are generated in immiscible fluorinated oil in a T-junction and are coaxially focused into a jet by helium gas in the nozzle in one device component. In some implementations, the droplet generation frequency can be modified from 10 Hz to 120 Hz by controlling the flow rate ratios and synchronization is achieved by applying the droplet generation trigger signal through the embedded electrodes.

Figure 4A:
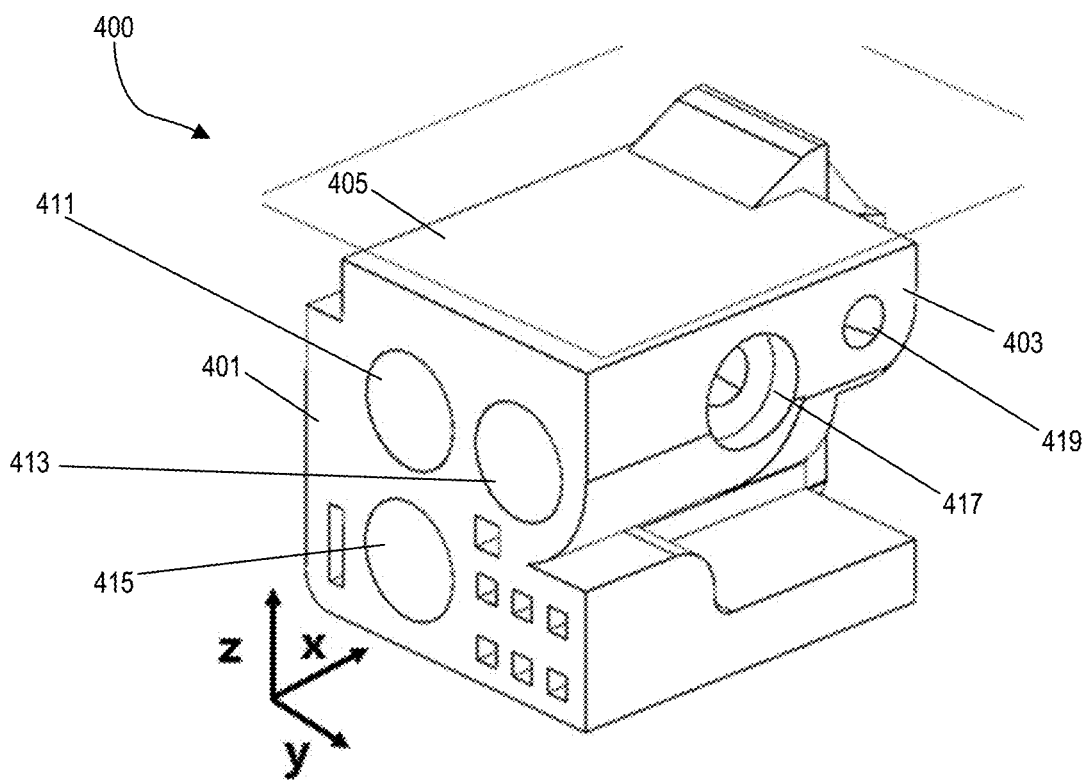
FIG. 4A is a perspective view of a single piece droplet generation and injection device for the sample injection system of FIG. 1 showing a rear surface and a first side surface of the device.
Figure 4B:
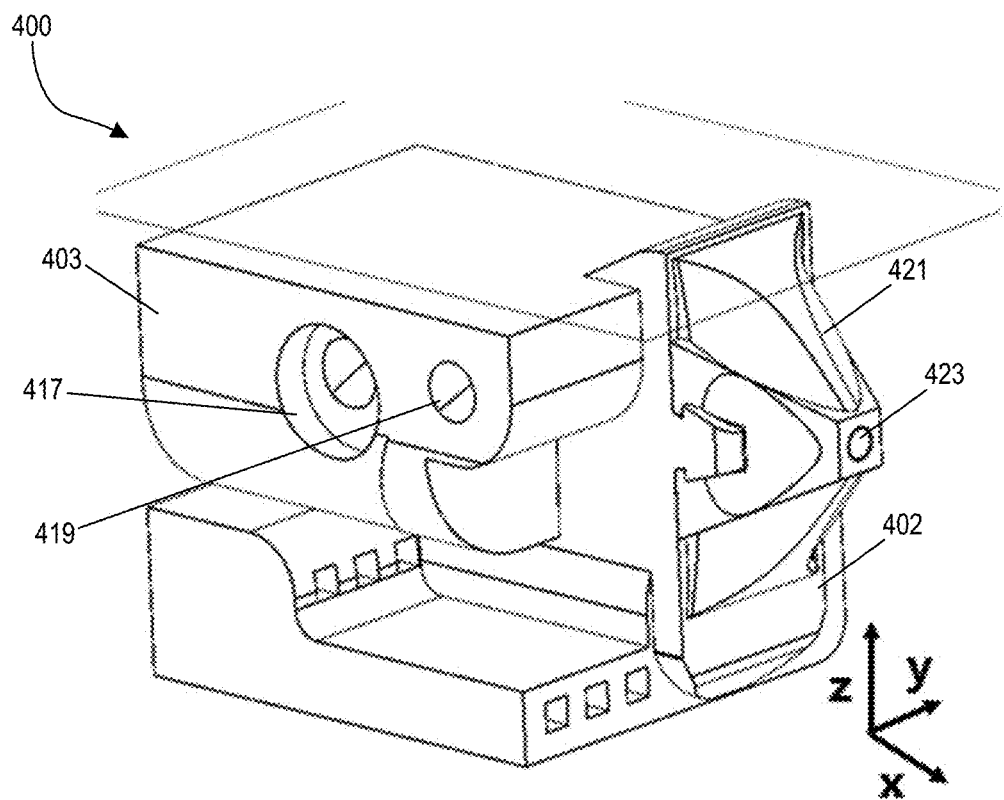
FIG. 4B is another perspective view of the single piece device of FIG. 4A showing the first side surface and a front surface of the device.
Figure 4C:
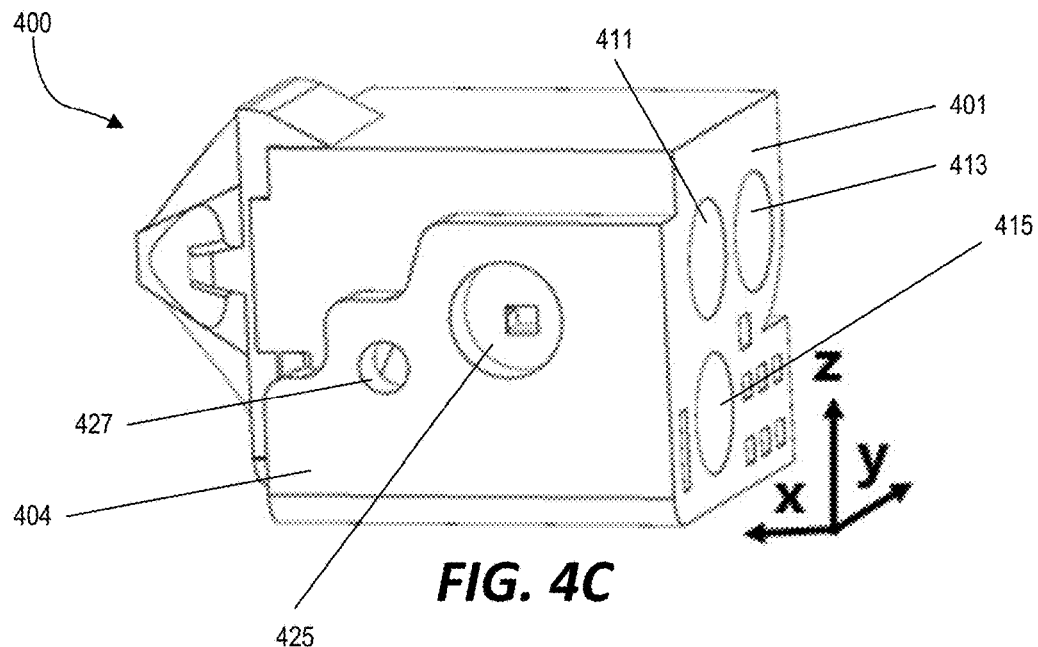
FIG. 4C is yet another perspective view of the single piece device of FIG. 4A showing the rear surface and a second side surface of the device.
Figure 4D:
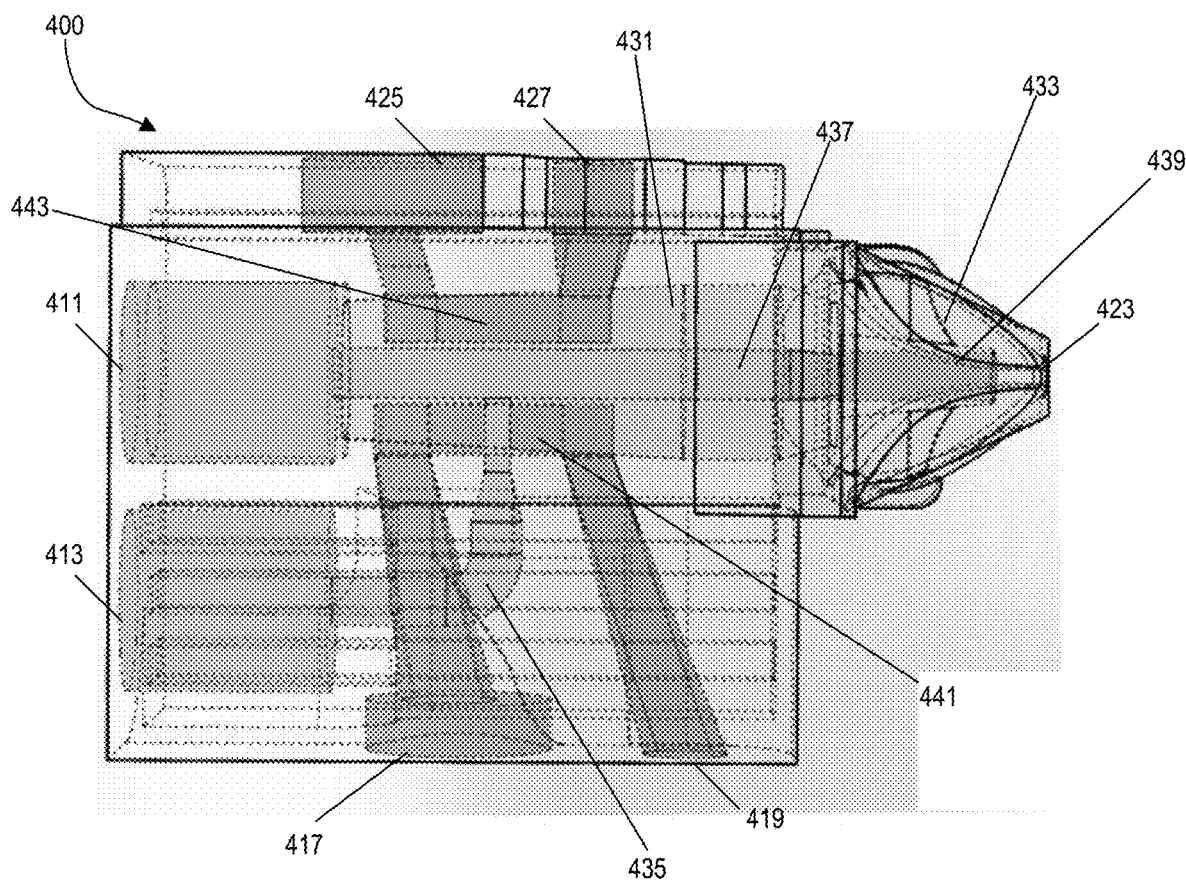
FIG. 4D is a partially transparent overhead view of the single piece device of FIG. 4A.

The single-piece device 400 in the example of FIGS. 4A through 4D has six exterior surfaces arranged in a substantially cuboid configuration: a rear surface 401, a front surface 402, a first side surface 403, a second side surface 404, a top surface 405, and a bottom surface (not shown). The perspective of FIG. 4A shows the rear surface 401, the first side surface 403, and the top surface 405. The perspective of FIG. 4B shows the front surface 402, the first side surface 403, and the top surface 405. The perspective of FIG. 4C shows the rear surface 401, the second side surface 404, and the top surface 405. FIG. 4D is a partially-transparent overhead view from the top surface 405 of the device 400 to illustrate the interior channels and structures of the device 400.

The rear surface 401 includes three channel opening inlets: a first fluid inlet opening 411, a second fluid inlet opening 413, and a gas inlet opening 415. The front surface 402 includes a nozzle protrusion 421 and a nozzle opening 423. The nozzle protrusion 421 is a tapered structure extending from the front surface 402 and terminating at a peak where the nozzle opening 423 is positioned. The first side surface 403 includes a pair of electrode openings 417, 419 and the second side surface 404 also includes a pair of electrode openings 425, 427.

As shown in FIG. 4D, the first fluid inlet opening 411, the second fluid inlet opening 413, and the gas inlet opening 415 extend into a body of the device 400 and are each configured to receive a tube or capillary that will supply a fluid or gas to the device 400. A gas channel 431 extends from the gas inlet opening 415 to an internal nozzle volume 433. The internal nozzle volume 433 is formed as a hollow chamber at least partially within the nozzle protrusion 421 and opens to the nozzle opening 423. Accordingly, pressurized air provided to the device 400 through the gas inlet opening 423 moves through the gas channel 431 into the internal nozzle volume 433 and exits the device 400 through the nozzle opening 523.

The fluid droplet-generation channel 437 extends from the first fluid inlet opening 411 towards a fluid outlet channel 439. The fluid outlet channel is formed as a hollow protrusion into the internal nozzle volume 433. The fluid outlet channel 439 includes an opening at its distal end positioned proximate to the nozzle opening 423. In some implementations, a first fluid (e.g., an oil fluid) is pumped into the device through the first fluid inlet opening 411, flows through the fluid droplet-generation channel 437 into the fluid outlet channel 439 where it is released towards the nozzle opening 423. The distal end of the fluid outlet channel 439 is positioned relative to the gas channel 431 in the internal nozzle volume 433 such that fluid exiting the fluid outlet channel 431 toward the nozzle opening 423 is coaxial with the pressurized gas that is exiting the internal nozzle volume through the nozzle opening 423. This coaxial arrangement with pressurized gas flow surrounding the fluid stream in the same output direction results in a "jetting" of the fluid stream through the nozzle opening 423.

A sample channel 435 is also formed within the device 400 coupling the second fluid inlet opening 413 to the fluid droplet-generation channel 437. In the specific example of FIGS. 4A through 4D, the first fluid inlet opening 411 and the second fluid inlet opening 413 are formed on the same surface of the device 400 (i.e., the rear surface 401). Accordingly, the sample channel 435 includes a curved section to redirect the flow direction of fluid through the sample channel 435 so that fluid from the sample channel 435 enters the fluid droplet-generation channel 437 at an angle. In the example of FIGS. 4A through 4D, the sample channel 435 meets the fluid droplet-generation channel 437 at a 90-degree angle forming a T-junction.

The electrode openings 417, 419 on the first side surface 403 are coupled to each other by a first electrode internal volume 441. The first electrode internal volume 441 is positioned adjacent to the fluid droplet-generation channel 437 and below the sample channel 435 at the T-junction (i.e., the location where the sample channel 435 meets the fluid droplet-generation channel 437. In this example, one electrode opening 417 is larger than the other electrode opening 419 on the first side surface 403. The larger electrode opening 417 is also positioned slightly higher than the smaller electrode opening 419 on the first side surface 403 (as shown in FIG. 4A). The larger electrode opening 417 includes an angled channel that extends over the sample channel 435 to a first end of the first electrode internal volume 441. The smaller electrode opening 419 also includes a channel that extends to the opposite end of the first electrode internal volume 441. After the device 400 is formed, a first electrode can be formed by filling the first electrode internal volume 441 through one or both of the electrode openings 417, 419 with a metal material. In some implementations, wires are then extended through the electrode openings 417, 419 to contact the deposited metal material in the first electrode internal volume 441. Alternatively, in some implementations, enough metal material is deposited to fill the first electrode internal volume 441 and the channels of both electrode openings 417, 419 so that a metal contact is created at the exterior surface of the electrode openings 417, 419. In still other implementations, an assembled/formed electrode component can be inserted through one of the electrode openings 417, 419 in order to position the electrode component adjacent to the droplet-generation channel 437 in the first electrode internal volume 441.

Similarly, the electrode openings 425, 427 on the second side surface also each include a channel extending the opening to a second electrode internal volume 443. The second electrode internal volume 443 is formed adjacent to the droplet-generation channel 437 opposite the first electrode internal volume 443. A second metal electrode may be positioned in the second electrode internal volume 443 by methods similar to those described above in reference to the first electrode internal volume 441 (e.g., metal material depositing or positioning an assembled/formed electrode device into the second electrode internal volume 443 through one of the electrode openings 425, 427).

FIGS. 4A through 4D illustrate one example of the device in which the first electrode internal volume is positioned at the T-junction below the sample channel 435. However, in other implementations, the internal and external structures of the device 400 may be arranged differently. For example, FIGS. 5A, 5B, and 5C illustrate another example of the device 400. The device 400 in this example includes the same components and internal channels for fluid and gas flow as in the example of FIGS. 4A through 4D. However, in this example, the first electrode 503 is positioned adjacent to the droplet-generation channel 437 above the sample channel 435. The second electrode 501 is similarly placed adjacent to the droplet-generation channel 437 opposite the first electrode 503. This placement of the first electrode 503 can be achieved, in some implementations, by a different placement of the electrode openings 417, 419 or by a different angle of the channels coupling the electrode openings 417, 419 to the first electrode internal volume 441. Alternatively, the first electrode internal volume 441 may be sized to include portions that are both above and below the sample channel 435 such that the first electrode internal volume surrounds the sample channel 435.

The device 400 is operated, in some implementations, based on the systems and methods described above in reference to FIGS. 1 through 3B. A second fluid channel 102 (i.e., an "oil" channel) is coupled to the first fluid inlet opening 411 by a capillary or tube and a first fluid channel 101 (i.e., a sample channel) is coupled to the second fluid inlet opening 413 by another capillary or tube. Similarly, a pressurized helium gas source is coupled to the gas inlet opening 415 by yet another capillary or tube. Oil pumped into the first inlet opening 411 flows into and through the droplet-generation channel 437 and droplets of the aqueous sample suspension are introduced into the droplet-generation channel 437 from the sample channel 435. The size and frequency of the droplets can be controlled by regulating operation of the fluid pumps to adjust the fluid flow rates in the first fluid channel 101 and the second fluid channel 102 as described above in reference to FIG. 2. Furthermore, the droplets are then synchronized with the pulses of the x-ray laser beam by applying a triggering signal to the fluid in the droplet-generation channel through the electrodes positioned in the first electrode internal volume 441 and the second electrode internal volume 443.

By providing the droplet generation junction, the droplet triggering electrodes, and the nozzle itself in a single piece device, the total travel distance of the droplets is reduced (in some implementations, to less than 1 cm). Single-piece devices such as device 400 of FIGS. 4A through 4D are also compatible in high-pressure systems and reduce complexity of the device & experimental setup.

Thus, the invention provides, among other things, a single-piece device for generating sample droplets in a "water-in-oil" stream, synchronizing droplet frequency with a pulse rate of a serial crystallography laser beam, and ejecting the sample as a jetted stream. Other features and advantages of the invention are set forth in the following claims.

What is claimed is:

1. A droplet generator system for serial crystallography comprising:
 a single-piece component including
  an internally-formed droplet-generation channel extending from a first fluid inlet opening to a nozzle of the single-piece component, wherein the first fluid inlet opening is positioned on a first exterior surface of the single-piece component;
  an internally-formed sample channel extending from a second fluid inlet opening to the droplet-generation channel, wherein the second fluid inlet opening is positioned on the first exterior surface of the single-piece component, and wherein the sample channel joins the droplet-generation channel at a T-junction;
  the nozzle extending from a second exterior surface of the single-piece component, the second exterior surface opposite the first exterior surface, the nozzle configured to eject a stream of segmented aqueous droplets in a carrier fluid from the droplet-generation channel through a nozzle opening of the nozzle;
a first pair of electrode chambers formed in a third exterior surface of the single-piece component, the third exterior surface oriented perpendicular to the first exterior surface and the second exterior surface, the first pair of electrode chambers positioned adjacent to a first side of the droplet-generation channel near the T-junction between the droplet-generation channel and the sample channel;
a first pair of electrodes, wherein each electrode is positioned in one of the first pair of electrode chambers;
a second pair of electrode chambers formed in a fourth exterior surface of the single-piece component, the fourth exterior surface opposite the third exterior surface, the second pair of electrode chambers positioned adjacent to a second side of the droplet-generation channel and opposite the first pair of electrode chambers;
a second pair of electrodes, wherein each electrode is positioned in one of the second pair of electrode chambers; and
a pressurized gas channel extending from a gas inlet opening to an internal chamber of the nozzle, wherein the gas inlet opening is positioned on the first exterior surface of the single-piece component.

2. The droplet generator system of claim 1,
wherein the sample channel includes a curved section configured to redirect a fluid flow towards the junction.

3. The droplet generator system of claim 1, wherein a distal end of the droplet-generation channel is positioned in the internal chamber of the nozzle proximate to the nozzle opening such that fluid leaving the droplet-generation channel is expelled through the nozzle opening as a jetted stream coaxially with a pressurized gas received in the internal chamber of the nozzle.

4. The droplet generator system of claim 1, wherein, when a sample fluid is supplied to the single-piece component through the sample channel and an oil fluid is supplied to the single-piece component through the droplet-generation channel, the sample fluid flows with the oil fluid at the junction as a sequence of sample fluid droplets in a stream of oil fluid.

5. The droplet generator system of claim 4, further comprising a signal generator configured to apply a triggering signal to the first pair of electrodes and the second pair of electrodes, wherein the triggering signal applied by the electrodes controls a timing of the sample fluid droplets moving through the droplet-generation channel towards the nozzle.

6. The droplet generator system of claim 1, wherein the single-piece component is selected from a group consisting of a 3D printed component and an injection molded component.

7. A method of operating the droplet generator system of claim 1 for serial crystallography, the method comprising:
controllably providing a sample fluid to the single-piece component through the first inlet opening at a first flow rate;
controllably providing an oil fluid to the single-piece component through the second inlet opening at a second flow rate, wherein the sample fluid flows with the oil fluid at the junction as a sequence of sample fluid droplets in a stream of the oil fluid;
adjustably controlling a frequency of sample fluid droplets in the stream of oil fluid by adjusting the first flow rate and the second flow rate; and
synchronizing a timing of the sample fluid droplets with a pulse timing of a laser for serial crystallography by applying a triggering signal to electrodes positioned in the electrode chambers of the single-piece component.

8. The droplet generator system of claim 1, further comprising
an oil fluid supply system coupled to the first fluid inlet opening and configured to supply an oil fluid to the single-piece component;
a sample fluid supply system coupled to the first fluid inlet opening and configured to supply an oil fluid to the single-piece component;
a pressurized gas supply system coupled to the gas inlet opening and configured to supply the pressurized gas to the single-piece component; and
an electronic controller configured to
generate control signals to the oil fluid supply system and the sample fluid supply system to controllably regulate a rate at which the sample fluid and the oil fluid are pumped into the single-piece component, wherein the sample fluid flows with the oil fluid at the T-junction as a sequence of sample fluid droplets in the oil fluid stream, and
controllably regulates an electrical signal applied to the droplet-generation channel by the electrodes to adjust a timing at which the sample fluid droplets are ejected through the nozzle opening of the single-piece component.

* * * * *